Oct. 31, 1950     H. GREENBERG     2,528,431
THREAD GAUGE
Filed April 14, 1948
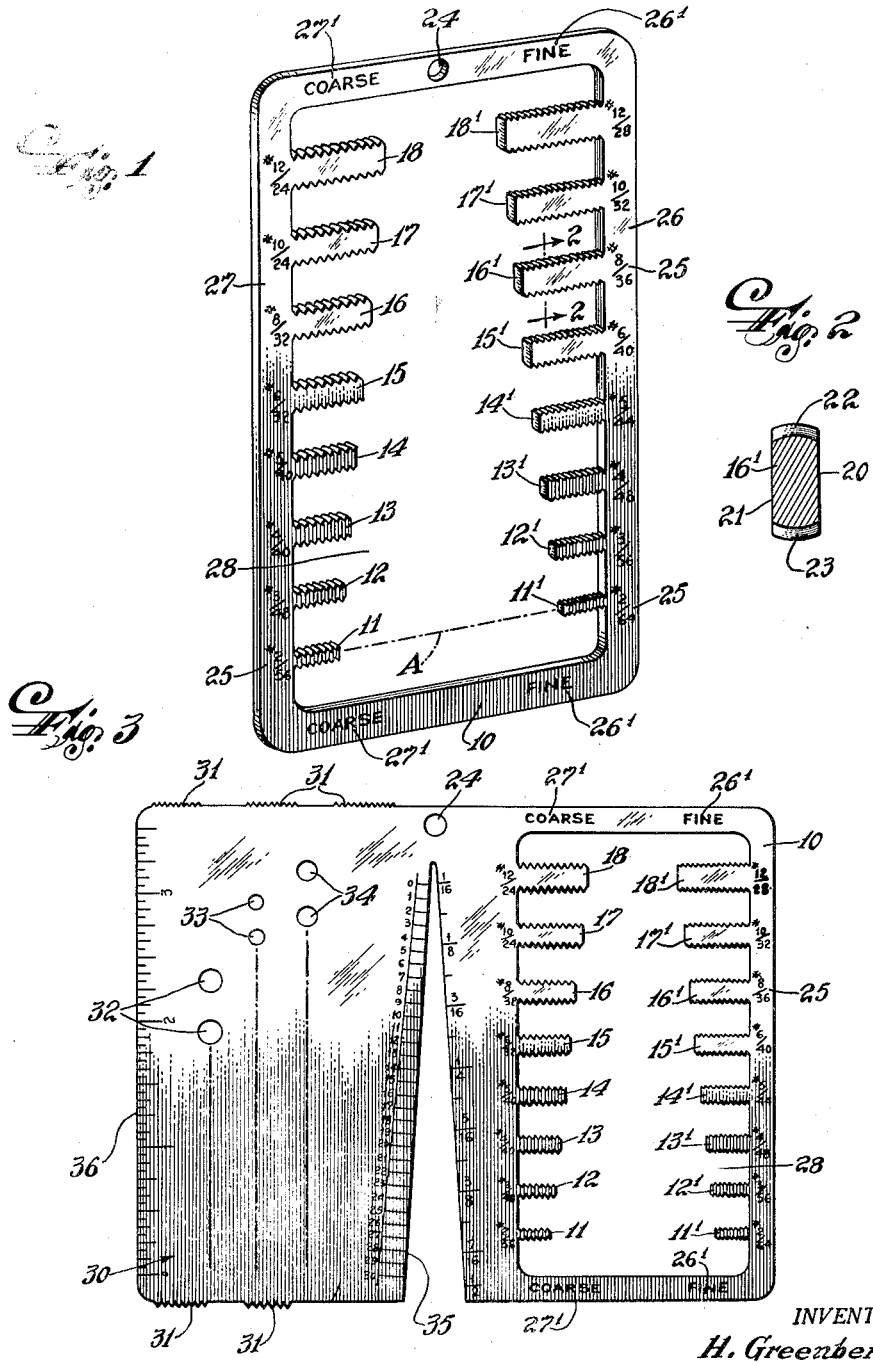
INVENTOR.
H. Greenberg
BY
ATTORNEY Patented Oct. 31, 1950

2,528,431

UNITED STATES PATENT OFFICE 2,528,431

THREAD GAUGE

Herman Greenberg, New York, N. Y.

Application April 14, 1948, Serial No. 20,950

2 Claims. (Cl. 33—199)

This invention relates to improvements in gages, and more particularly to a gage for the measurement of the thread sizes of nut and similar members.

The gage of my invention, as will appear from the description hereinafter, may be manufactured in any desired or convenient form and of any desired material, providing a ready means for accurately and rapidly determining the size, that is, the internal thread diameter and type, of nut and similar members.

The device is adapted to be provided with a number of fingers for that purpose arranged in such fashion that one may accurately and rapidly determine the size and type of the nut or similar member being measured.

It is especially valuable where it is desired to rapidly gage such members by selecting a specimen member from the lot, where it is desired to sort out such members which may have become intermingled, and for similar gage purposes.

As will appear from the description hereinafter, the gage of my invention is of such convenient construction and size that it may be slipped into the mechanic's pocket or suspended from a wall or other support when not in use.

Embodiments of structures employing my invention are shown in the accompanying drawing and described in the ensuing specification merely by way of example. The invention is not limited thereto but includes all other forms which would come within the scope of the appended claims. In the drawings:

Fig. 1 is a perspective view of a gage embodying my invention,

Fig. 2 is an enlarged, vertical, transverse, sectional view, taken on line 2—2 of Fig. 1, and Fig. 3 is a top plan view of another form thereof, wherein the same is combined in a multi-purpose gage.

As shown in the drawings, the gage of my invention preferably comprises a flat, relatively thin plate 10 which may be as shown, of generally rectangular outline, having parallel, spaced side walls 26 and 27, and is internally cut out as generally indicated by the reference character 28, to define one or more sets of inwardly directed fingers 11, 11'—18, 18', in graduated series, the fingers of each set being spaced apart sufficiently for the purpose, said fingers being secured to and inwardly directed from the side walls of the gage.

The fingers are preferably arranged in axially opposed sets, of different type—for example, as shown in the drawings, each set consists of a finger corresponding to the American National coarse thread size and an opposed finger of the corresponding American National fine thread size. This axial registry of opposed fingers is indicated by the axis line A of Fig. 1, and facilitates rapid shifting of the nut or other object being gaged from the fine to coarse fingers of a given size, so that the device is highly practical and effective in use. It will be understood that the gage may be made with additional sets of fingers beyond the first set 11—11' of a greater or lesser number than shown in the drawing, as desired; the showing of sets 12, 12'—18, 18' is for the purpose of illustrating one practical arrangement for the purpose described.

The finger 16', selected as illustrative of the construction of all fingers of said gage plate, and shown for this purpose cross-sectionally in Fig. 2, is provided with flat parallel upper and lower faces 20, 21 and with threaded longitudinal edges 22, 23. The indicia 25 on finger 16' indicates that a nut threaded thereon will be of size No. 8/36. The sets of fingers 11, 11'—18, 18' are preferably so arranged that all fingers with fine threads project inwardly from one wall (26) of the plate; those with coarse threads project inwardly from the opposite wall. This further aids a rapid check to be made in gaging objects. If desired, the plate 10 may be provided with "fine" and "coarse" designations 26', 27', in registry with the "fine" and "coarse" sides thereof, 26, 27 respectively.

In operation, the nut to be gaged will properly register with the threaded longitudinal edges of that finger corresponding in size and spacing of threads to that of the nut, and may be readily threaded on such finger, thereby accurately and rapidly indicating the number and thread type thereof, as indicated by the respective indicia 25. Said indicia may be marked on the flat face of the fingers or marginally along the frame or otherwise in identifying relation to said fingers. The other face of plate 10 may contain the same relative indicia and markings as the face shown in the drawing. While I have shown the fingers as unitarily formed with the plate 10 and inwardly depending from the side walls thereof, they might be separately formed and secured to said walls, if so desired. The plate 10 may be provided with an aperture 24 or other suspension means, if so desired and may be formed of any desired or convenient outline, material and proportions. In addition to the form shown in Fig. 1, wherein it is shown as a unitary, self-contained gage, it may be combined with other gages or objects. For example, as shown in Fig. 3, the plate 10 may be secured to or formed unitarily with a multi-gage unit 30 having thread pitch markings 31 along marginal edges thereof, and having drill gage apertures 32, wire gage apertures 33, tapered pin gage apertures 34, one or more screw gage recesses 35, and one or more ruling edges 36—marked with suitable identifying indicia and combined, with plate 10, into a multi-purpose gage 30 to fill all ordinary gage requirements. It will be understood that the number and arrangement of the gage apertures 32, 33, 34 is a matter of choice, the showing of Fig. 3 being intended only to illustrate one of many possible forms for the purpose mentioned.

Having thus described my invention, what I claim as new and desire to secure by Letter Patent, is:

1. A thread gage comprising an open flat frame of sheet material provided with sets of fingers in graduated series extending inwardly from opposite sides of said frame and said fingers being spaced from each other at their free ends, said fingers having flat sides of substantially the same thickness as that of said frame with the opposite edges of each of said fingers being threaded with common threading, with the threads on the respective fingers being of different sizes for gaging the internal threads of nuts to be threaded onto said fingers.

2. A thread gage comprising an open flat frame of sheet material provided with sets of fingers extending inwardly from opposite sides of said frame and said fingers being spaced from each other at their free ends, said fingers having flat sides of substantially the same thickness as that of said frame with the opposite edges of each of said fingers being threaded with common threading, with the threads on the respective fingers being of different sizes for gaging the internal threads of nuts to be threaded onto said fingers, and the respective fingers of the sets extending inwardly from the opposite sides of the frame arranged substantially opposite each other.

HERMAN GREENBERG.

REFERENCES CITED

The following references are of record in the file of this patent:

UNITED STATES PATENTS

| Number | Name | Date |
|---|---|---|
| 552,238 | Darling | Dec. 31, 1895 |
| 628,310 | Goldner | July 4, 1899 |
| 1,339,573 | Pettibone | May 11, 1920 |

FOREIGN PATENTS

| Number | Country | Date |
|---|---|---|
| 592,723 | Great Britain | Sept. 26, 1947 |

OTHER REFERENCES

Publication of Stewart Mfg. Co., Washington 9, D. C.

Publ.: Gages, Gaging and Inspection, by D. T. Hamilton, First Ed. 1918, The Industrial Press, New York.